United States Patent [19]

Barbero et al.

[11] Patent Number: 5,725,316
[45] Date of Patent: Mar. 10, 1998

[54] WHEEL BEARING WITH SENSOR DEVICE

[75] Inventors: Stefano Barbero, Schweinfurt; Uwe Brockmüller, Oberwern; Norbert Huhn, Werneck; Achim Müller, Dittelbrunn, all of Germany

[73] Assignee: SKF GmbH, Schweinfurt, Germany

[21] Appl. No.: 717,633

[22] Filed: Sep. 23, 1996

[30] Foreign Application Priority Data

Sep. 22, 1995 [DE] Germany .................. 195 35 272.6

[51] Int. Cl.⁶ .................................................. F16C 19/00
[52] U.S. Cl. .................................................. 384/448
[58] Field of Search .......................... 384/448, 446, 384/589, 544; 324/173, 174

[56] References Cited

U.S. PATENT DOCUMENTS 5,438,260  8/1995  Rigaux et al. ................. 384/448
5,564,839  10/1996  Ouchi et al. .................. 384/448
5,567,058  10/1996  Morita et al. .................. 384/448
5,603,575  2/1997  Ouchi ............................ 384/448

Primary Examiner—Lenard A. Footland
Attorney, Agent, or Firm—Baker & McKenzie

[57] ABSTRACT

A wheel bearing is provided with a sensor device for ABS systems, wherein a support ring for a sensor coupled is rotationally movable and is releasably secured by a groove in the bearing race from the axial movement. At initial installation the unit is placed on the bearing seat, pressing the support ring into predetermined axial position on a cylindrical surface of the axle member. In operation any creeping of the bearing race will cause no damage, and when the bearing is replaced the support ring with sensor remains in place on the axle member.

13 Claims, 1 Drawing Sheet

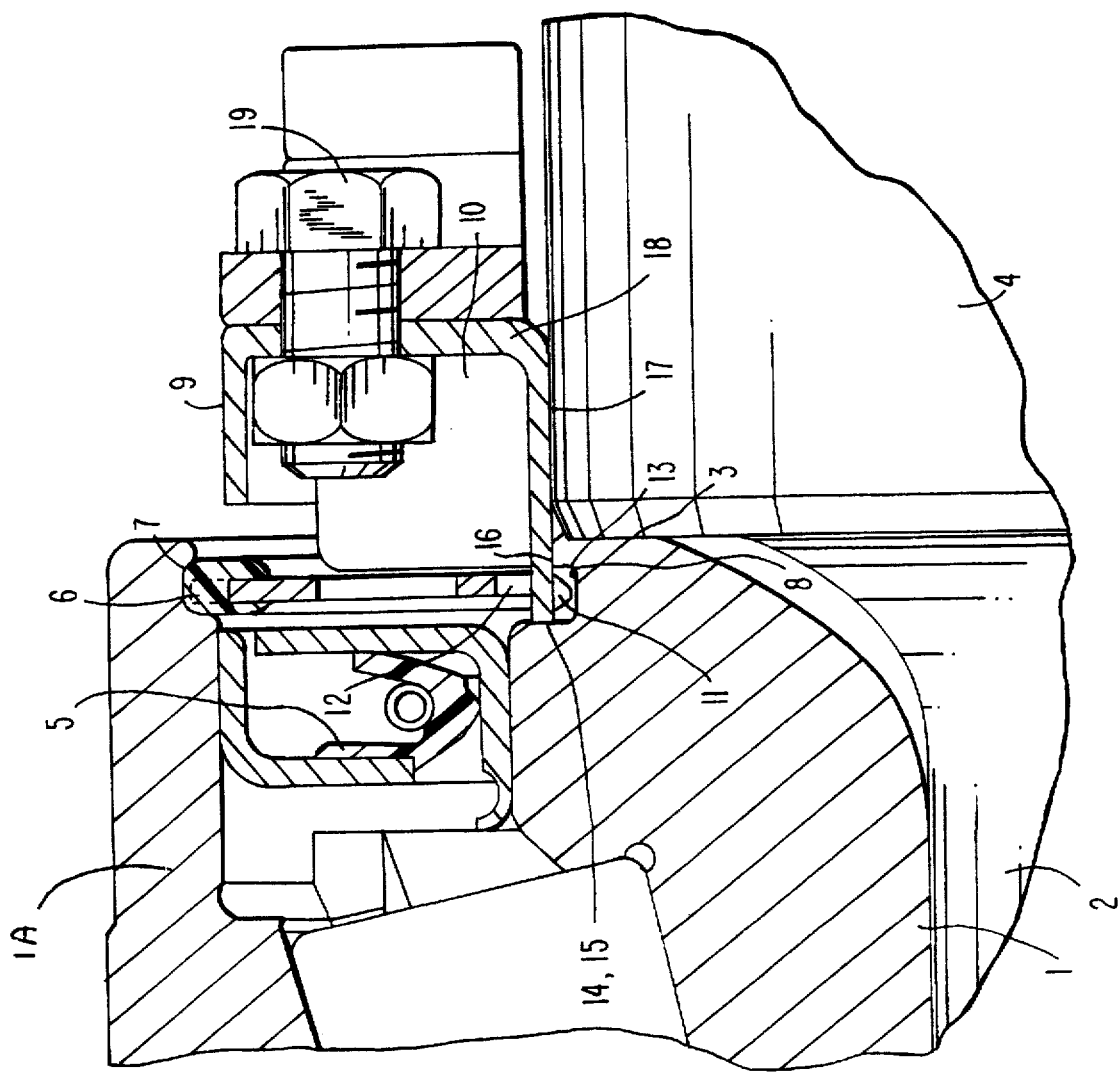

WHEEL BEARING WITH SENSOR DEVICE

BACKGROUND OF THE INVENTION

The invention relates to a wheel bearing with sensor device for ABS systems, according to the generic clause of the independent claim.

French patent No. 2,660,975 has disclosed the combination of a sensor device with a wheel bearing to create a compact unit. In that embodiment, both the pulse ring and the sensor can be integrated with the bearing at the time of manufacture. Thus the sensor is fixed to a supporting ring provided with an annular interlock feature fixing it at an annular groove of the stationary bearing race. If the stationary race creeps in circumferential direction on its seating surface during operation for any reason, there is no danger in principle, with this arrangement, of breaking the sensor cable. The supporting ring, being frictionally locked in circumferential direction, is capable of remaining stationary in relation to the creeping race. For this purpose, a recess is provided for the sensor in the axle member, in which recess the sensor is positionally locked. The production of such recesses, however, involves increased cost. Besides, when changing the wheel bearing, the sensor must be taken out as well.

The object of the invention is to improve the wheel bearing mentioned above in such manner as to permit economical manufacture, change of bearing without taking out the sensor, and moreover no danger to the sensor in case of creeping movements of the stationary race.

SUMMARY OF THE INVENTION

The proposal according to the invention provides a compact subassembly consisting of wheel bearing and sensor device. Thus the sensor is fixed to a support ring and snapped into a radial groove of the stationary race. In addition, its contact surfaces bear axially on this race, being adequately dimensioned to allow the support ring to be pressed onto a cylindrical surface of the axle part at assembly. After assembly, the support ring is forcefit on this surface in exact axial position, and so secured in both circumferential direction and axially, sufficiently to prevent it from being carried along by the bearing race if it creeps or when it is dismantled. For this seating, it suffices to provide a cylindrical surface, a shoulder surface etc., on the axle element, easily produced, or, with stationary inner race, already present as a shoulder for the axle shaft.

The combination of the support ring with the stationary race is designed so that relative rotation with the creeping race is possible after a frictional starting torque has been overcome. Axially, the positionally locking elements form a dependable connection to maintain compactness as a unit in transport. However, the connection is freed immediately after overcoming a predetermined axial force in dismantling the bearing already mounted on the axle element, while the support ring remains fixed on the axle.

The arrangement according to the invention is economical to produce, simple to install, without need to find a precise position in circumferential direction, and —a special advantage— the wheel bearing can be taken out and a replacement installed, leaving the sensor on the axle member.

These features will now be described with reference to the example shown in the drawing.

BRIEF DESCRIPTION OF THE DRAWING

The single figure shows a partial longitudinal section of a wheel bearing with sensor device and stationary inner race 1.

DETAILED DESCRIPTION OF THE PREFERRED EMBODIMENT

The bearing is a two-row taper roller bearing, shown only in part. The inner race 1 is parted, placed on an axle shaft 2, and has its face 3 in contact with a shoulder 4 of the shaft 2.

Adjacent to a seal 5 closing off the bearing space, a pulse disk 6 is set in a groove 7 of the rotating race 1A. In a similar groove 8 of the inner race 1, a support ring 9 is inserted for a sensor 10 facing the disk 6 with a gap between. The connection is made with snap elements 11, snapped radially into the groove 8 and securing the support ring 9 axially against unintentional release. The groove 8 is provided with an adequate radial clearance 12 enabling the snap elements 11 to deflect even in installed condition of the bearing. The wall of the groove 8 shown to the left is higher radially, and provides an abutment 15 for the rotating contact surface 14 of the support ring 9. The wall 13 of the groove 8 shown at the right is less high and continuous with a centering surface 16 for the support ring 9. The assembly described permits relative rotation between support ring 9 and bearing race 1, as when the latter creeps on the shaft 2 in circumferential direction.

The support ring 9, in the region so far described, is essentially sleeve shaped, and then continues, likewise sleeve shaped, beyond the face 3 of the inner race 1. This portion is positively forcefit on the cylindrical periphery 17 of the shoulder 4 of the axle shaft 2.

The flange-like portion 18 of the support ring 9 is provided with a recess accommodating the sensor 10. It is attached to the support ring 9 by means of a bolt 19.

After the wheel bearing has been fabricated, the pulse disk 6 and support ring 9 with sensor 10 are installed. At initial assembly, this unit is placed on the axle shaft 2. By axial pressure, the support ring is pushed onto the cylindrical periphery 17 of the shoulder 4. The abutment surface 15 on the inner race 1 and the contact surface 14 of the support ring 9 thus transmit the pressure. The operation is terminated when the face 3 of the inner race 1 is in contact with the shoulder 4.

After assembly, any creep of the inner race 1 in circumferential direction will cause no damage to the sensor 10 or to its connecting cable, since a rotary motion in the vicinity of the groove 8 is possible after the starting torque has been overcome and the fit of the support ring 9 on the cylindrical periphery 17 remains firm.

If replacement of the wheel bearing becomes necessary, then the inner race 1 will have to be pulled from the axle shaft 2. The snap elements 11 then yield and snap out of the groove 8. Owing to its firm seat the support ring 9 and hence the sensor 10 remain precisely in position.

Upon installation of the replacement bearing the snap elements 11 snap into the groove 8 again, and the bearing as well as the sensor system 6, 10 is ready for service.

A similar result with all procedures and advantages as mentioned above, is obtained in the modification with rotating inner race. In that case, the sensor with support ring is arranged on the outer race. The specific embodiment described herein is merely illustrative of the general principals of the invention. Further variations and modifications of this invention are possible within the spirit and scope of the claims appended hereto.

We claim:

1. A wheel bearing assembly with a sensor device for ABS systems, including a pulse disk engaging a rotating race and a sensor support ring (a) axially interlocked by means of interlocking elements, and (b) frictionally interlocked circumferentially, characterized in that a support ring has axial contact surfaces in contact with a stationary bearing race by which surfaces said support ring can be mounted and forcefit in precise position on a cylindrical surface of the axle member at time of installation, the connection of the axial positioning interlocking elements with the stationary bearing race being releasable at disassembly of the wheel bearing.

2. A wheel bearing assembly operable with an axle and a sensor for an ABS system and able to be disassembled, the wheel bearing assembly including stationary and rotating races, a pulse disc mounted to the rotating race, and a sensor support ring axially located with respect to the stationary race with said sensor positioned adjacent said pulse disc, characterized in that the support ring has axial end surfaces for contacting and axially positioning said support ring in a predetermined position with respect to the stationary race and has inner circumferential wall surfaces for forcefit mounting the support ring onto the axle, said wheel bearing assembly further comprising coupling means for releasably holding said support ring and sensor carried by said support ring in said predetermined axial position relative to the stationary race, whereby the stationary race and said support ring are separable from each other.

3. A wheel bearing assembly according to claim 2, characterized in that said coupling means comprises snap elements distributed around the circumference of the support ring for releasably engaging said stationary race.

4. A wheel bearing assembly according to claim 3, characterized in that said force fit mounting of the support ring onto the axle establishes a frictional interlock that is greater than the force required to release the coupling means between stationary race and support ring.

5. A wheel bearing assembly according to claim 4, characterized in that said stationary race has a circumferential groove, and said coupling means extends radially outward from said support ring into said groove.

6. A wheel bearing assembly according to claim 3, characterized in that said stationary race has a circumferential groove, and said coupling means extends radially outward from said support ring into said groove.

7. A wheel bearing assembly according to claim 2 wherein said support ring comprises an inner tube whose bore frictionally engages the axle, a concentric outer tube and a radially extending flange between and engaging said tubes.

8. A wheel bearing assembly according to claim 7 wherein said axial end surfaces of said support ring is the end of said inner tube.

9. A wheel bearing assembly according to claim 7 wherein said sensor is mountable on said flange of said support ring.

10. A wheel bearing assembly according to claim 2, characterized in that said forcefit mounting of the support ring onto the axle establishes a frictional interlock that is greater than the force required to release the coupling means between stationary race and support ring.

11. A wheel bearing assembly according to claim 10, characterized in that said stationary race has a circumferential groove, and said coupling means extends radially outward from said support ring into said groove.

12. A wheel bearing assembly according to claim 2, characterized in that said stationary race has a circumferential groove, and said coupling means extends radially outward from said support ring into said groove.

13. A wheel bearing assembly according to claim 12 wherein said groove in said stationary race has diameter greater than the diameter of the support ring, said coupling means having snap elements that are resiliently deflectable to extend into said groove.

* * * * *